(12) United States Patent
Zhang et al.

(10) Patent No.: US 7,788,911 B2
(45) Date of Patent: Sep. 7, 2010

(54) ADSORBED SUBSTANCE ACCUMULATION REDUCTION FOR EXHAUST TREATMENT EQUIPMENT

(75) Inventors: Yuetao Zhang, Columbus, IN (US);
Daniel D. Wilhelm, Nashville, IN (US);
Joseph M. Brault, Columbus, IN (US);
Venkata Lakkireddy, Columbus, IN (US); James A. Cramer, Columbus, IN (US); Thomas A. Grana, Columbus, IN (US)

(73) Assignee: Cummins Filtration, Inc., Nashville, TN (US)

( * ) Notice: Subject to any disclaimer, the term of this patent is extended or adjusted under 35 U.S.C. 154(b) by 1019 days.

(21) Appl. No.: 11/491,207

(22) Filed: Jul. 21, 2006

(65) Prior Publication Data

US 2008/0016853 A1 Jan. 24, 2008

(51) Int. Cl.
*F01N 3/00* (2006.01)
*F02B 27/04* (2006.01)

(52) U.S. Cl. .............................. 60/297; 60/273; 60/285; 60/295

(58) Field of Classification Search .................... 60/274, 60/284, 297, 273, 276, 285, 295
See application file for complete search history.

(56) References Cited

U.S. PATENT DOCUMENTS

| 4,510,749 | A | 4/1985 | Taguchi et al. |
|---|---|---|---|
| 5,193,340 | A | 3/1993 | Kamihara |
| 5,711,149 | A | 1/1998 | Araki |
| 5,855,854 | A | 1/1999 | Shinzawa et al. |
| 5,924,280 | A | 7/1999 | Tarabulski |
| 6,170,260 | B1 * | 1/2001 | Ishii et al. ............... 60/297 |
| 6,367,245 | B1 | 4/2002 | Yasui et al. |
| 6,422,008 | B2 | 7/2002 | Voss et al. |
| 6,601,383 | B2 * | 8/2003 | Hasegawa et al. ......... 60/276 |
| 6,883,307 | B2 | 4/2005 | Iihoshi et al. |
| 6,951,100 | B2 | 10/2005 | Kuboshima et al. |
| 6,976,355 | B2 | 12/2005 | Imada et al. |
| 7,181,906 | B2 * | 2/2007 | Dalla Betta et al. ......... 60/286 |
| 7,210,286 | B2 * | 5/2007 | Sun et al. ................ 60/295 |

\* cited by examiner

*Primary Examiner*—Thomas E Denion
*Assistant Examiner*—Audrey Klasterka
(74) *Attorney, Agent, or Firm*—Krieg DeVault LLP; J. Bruce Schelkopf; L. Scott Paynter

(57) ABSTRACT

A system, method and computer operable code is disclosed for reducing HC and liquid accumulation in an exhaust gas treatment system. A timer is used to monitor the amount of time the system spends in either absorption mode or desorption mode. If the exhaust gas temperature at the inlet of a oxidation catalyst device is below an absorption threshold, the timer is instructed to count up. If the exhaust gas temperature is above a desorption threshold, the timer is instructed to count down. At a predetermined timer threshold value, the engine is instructed to enter a thermal management mode operable to reduce accumulation of HC and liquid in the exhaust gas management system.

20 Claims, 3 Drawing Sheets

ADSORBED SUBSTANCE ACCUMULATION REDUCTION FOR EXHAUST TREATMENT EQUIPMENT

BACKGROUND

The present invention relates generally to exhaust systems and more particularly, but not exclusively, to the reduction of undesirable adsorbed substances that accumulate in an emission control system for an internal combustion engine.

Reported consequences of excessive hydrocarbon (HC) and $H_2O$ adsorption in emission control systems for internal combustion engines include significant temperature spikes and tailpipe emission of a conspicuous white vapor with a noticeable odor under certain conditions—especially after the engine idles for an extended period of time. These conditions may potentially lead to system damage or failure, which can result in service costs or warranty claims.

As a result of these hazards, damage/degradation of oxidation catalytic devices and associated soot filters has been reported. The low exhaust temperature and low space velocity (high residence time) of exhaust, which is typical for idle operations, favors HC absorption onto the surface of oxidation catalysts. Thus, for extended idle, HC accumulation may become substantial. Also $H_2O$ adsorption can become substantial under the same or similar conditions, which is particularly threatening when the system is subject to freezing temperatures while the system is nonoperational. As a consequence, a need exists for further contributions in this area of technology.

SUMMARY

One embodiment of the present invention is a unique technique for controlling the accumulation of adsorbed and/or absorbed substances. Other embodiments include unique methods, systems, devices, and apparatus to control adsorption and/or absorption of one or more substances by an aftertreatment device.

A further embodiment is directed to a system and method for controlling treatment of exhaust gas during extended periods of engine idle operation and/or low exhaust temperature is disclosed that may include an engine connected with an electronic control module or control unit. The control unit may be programmed or operable to control the engine speed or RPM of the engine at idle speeds. As the engine idles, it produces exhaust gas that must be passed through an exhaust gas treatment system before passing to the atmosphere. The exhaust gas may be filtered through the use of an oxidation catalyst unit located in an exhaust pipe connected downstream of the engine.

A temperature sensor may be positioned in the exhaust pipe upstream of the oxidation catalyst unit for measuring the temperature of the exhaust gas as it enters the oxidation catalyst unit. The control unit obtains a plurality of temperature readings from the temperature sensor. When a respective temperature reading is above a desorption value, the control unit causes the value of a timer, accumulated hydrocarbon (HC) level, and/or accumulated $H_2O$ level to decrease or count down. When the respective temperature value is below an absorption value, the control unit causes the value of the timer, accumulated hydrocarbon (HC) level, and/or accumulated $H_2O$ level to count up. As soon as the timer, accumulated hydrocarbon (HC) level, and/or accumulated $H_2O$ level reaches a maximum threshold, the control unit enters desorption mode or thermal management mode.

The thermal management mode may cause the control unit to direct the engine to produce exhaust gas at a higher temperature level and/or space velocity. In addition, the thermal management mode may disable fuel dosing of the exhaust gas before it enters the oxidation catalyst unit. The thermal management mode may last for a predetermined period of time. At the end of the thermal management mode, the value of the timer is reset or cleared.

The system may include computer operable code for controlling the value of the timer as well as the engine. While the temperature of the exhaust gas at the inlet of the oxidation catalyst unit is below an absorption threshold, computer operable code increases the value of the timer. If the temperature of the exhaust gas at the inlet of the oxidation catalyst unit is above a desorption threshold, computer operable code decreases the value of the timer. When the timer reaches a threshold value, computer operable code implements a thermal management routine.

The thermal management routine places the engine in a desorption mode to remove the unwanted accumulation of a substance in the exhaust gas management system. The thermal management routine may instruct the control unit of the vehicle to place the engine in an enhanced idle mode. In response, computer operable code causes the control unit to increase the temperature and flow rate of the exhaust gas provided by the engine. This temperature elevation may be accomplished by increasing the speed of the engine (which may include changing valve/injection timing), changing geometry of a turbocharger, adjusting an intake throttle, adjusting an exhaust throttle, or the like. The control unit may also be instructed by computer operable code to disable fuel dosing during the desorption mode.

Further embodiments, forms, objects, features, advantages, aspects, and benefits of the present application shall become apparent from the following description and drawings.

BRIEF DESCRIPTION OF THE DRAWINGS

The figures are not necessarily to scale, emphasis instead being placed upon illustrating the principles of the invention. Moreover, in the figures, like reference numerals designate corresponding parts throughout the different views.

DETAILED DESCRIPTION OF REPRESENTATIVE EMBODIMENTS

Figure 1:
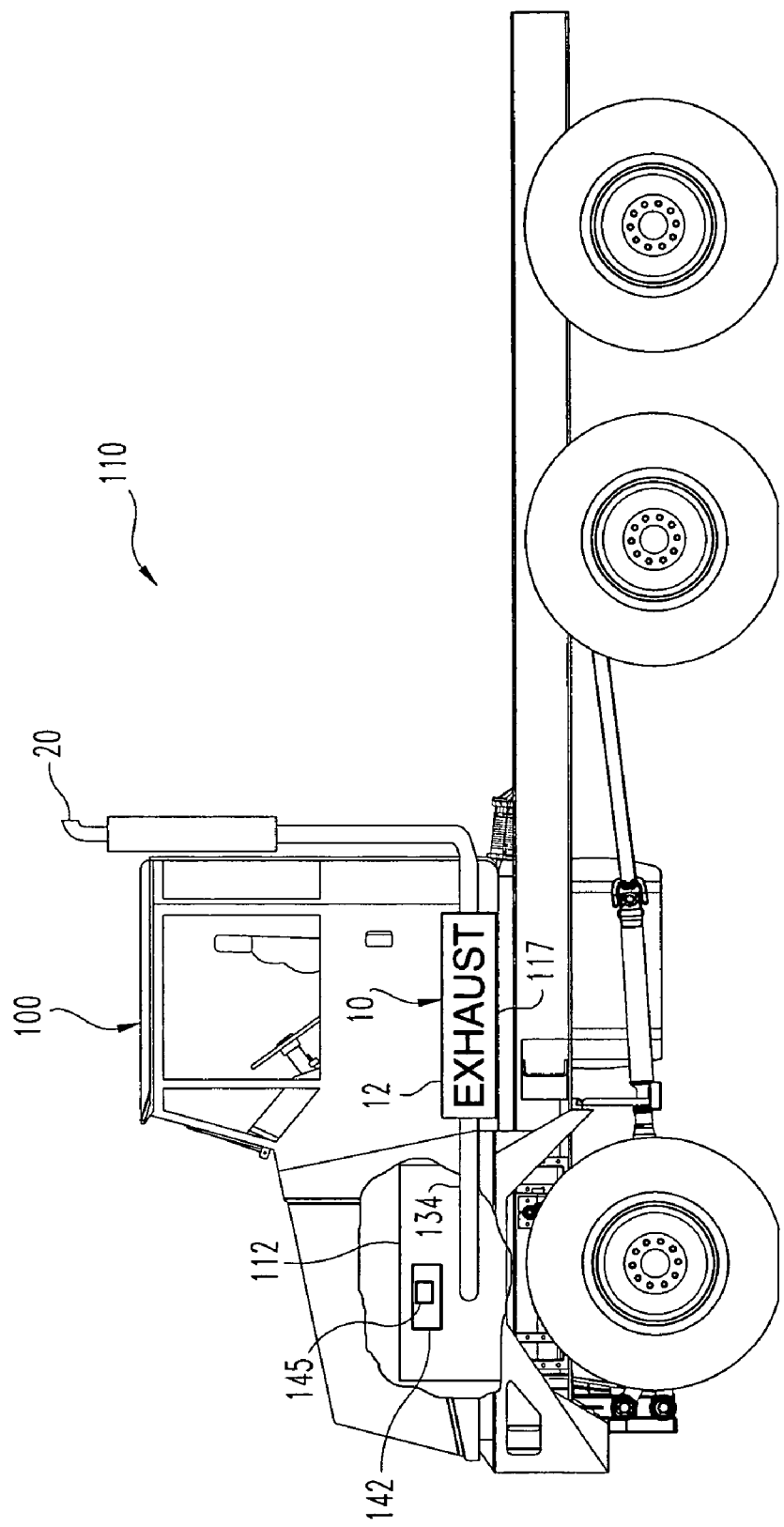
FIG. 1 is a partially diagrammatic view of a vehicle with an internal combustion engine system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts a vehicle 100 in the form of a semitractor, but could alternatively be any of a variety of other vehicle types such as a light, medium, or heavy duty truck, bus, car, SUV, motor coach, or different variety of land traveling vehicle. In other embodiments, the vehicle may be of a marine type. Vehicle 100 includes an internal combustion engine system 110 which includes an engine 112. System 110 further includes controller 142. Engine 112 is of a reciprocating piston type that is configured for compression ignition and direct injection or port-injected diesel fueling. However, in other embodiments, engine 112 may be of a different configuration and/or utilize a different fuel type.

Exhaust management subsystem 10 includes aftertreatment equipment 117 at least partially enclosed in subsystem conduit housing 12. Housing 12 may be formed in various different shapes and sizes, as known in the art. Exhaust from engine 112 travels through a conduit 134 to housing 12 of exhaust management subsystem 10. Aftertreatment equipment 117 provides for the removal of undesirable 25 constituents from the exhaust stream as it passes through housing 12 under the regulation of controller 142. Aftertreatment by equipment 117 of subsystem 10, exhaust is released to the atmosphere through tail pipe 20.

Figure 2:
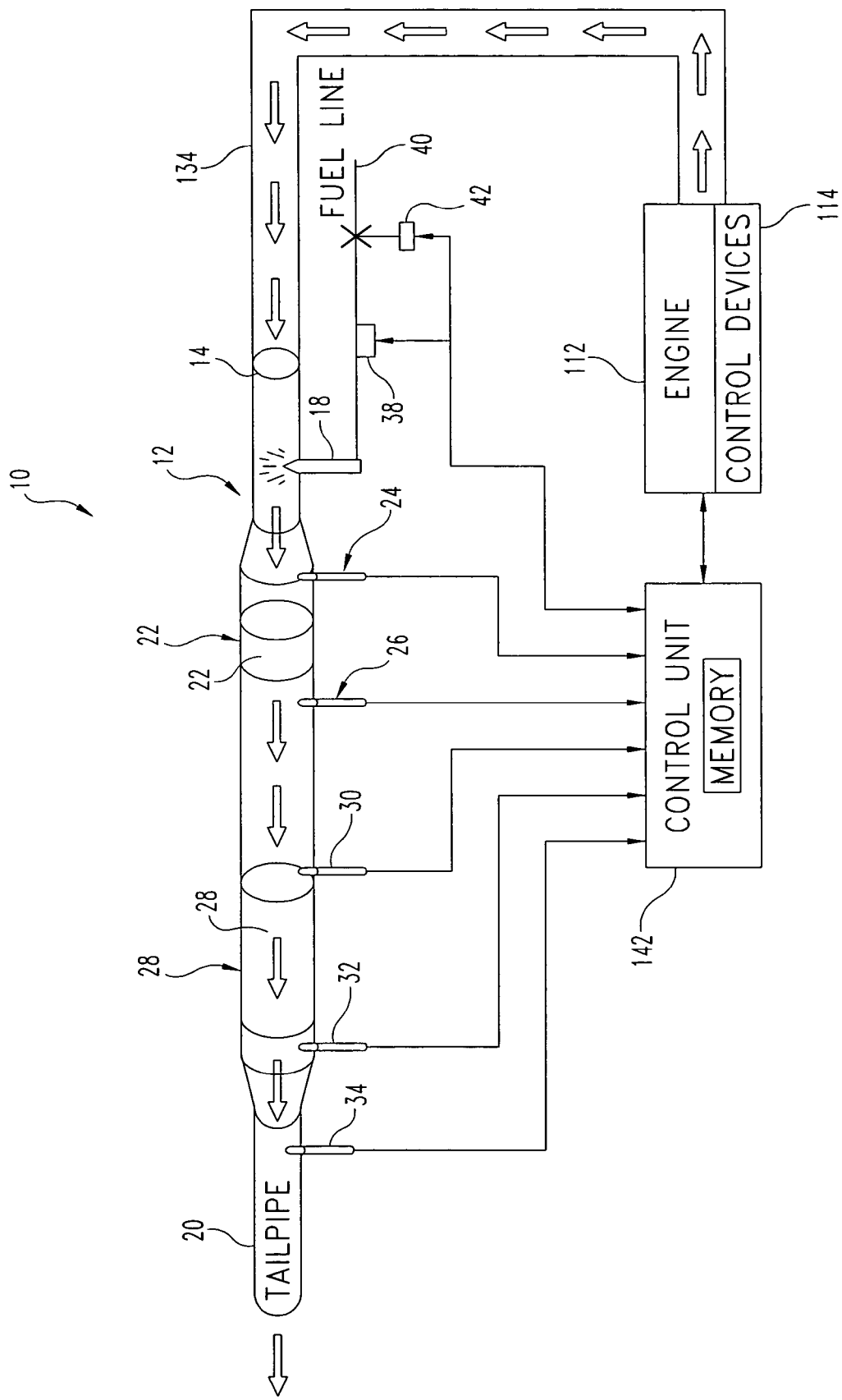
FIG. 2 is a diagram of an illustrative exhaust gas management subsystem for the engine system of FIG. 1.

FIG. 2 depicts further aspects of exhaust gas management subsystem 10. Subsystem 10 is operable to prevent, reduce, or limit accumulation of hydrocarbon (HC), $H_2O$, and potentially other substances that are usually in liquid form at standard temperature and pressure. These substances tend to be adsorbed on surfaces of aftertreatment equipment 117 positioned within housing 12 during extended periods of idle operation. Housing 12 includes an exhaust gas inlet 14 receiving exhaust generated by an engine 112 from conduit 134 in the direction indicated by the illustrated arrow.

The exhaust gas management subsystem 10 includes a doser 18 located downstream of the exhaust gas inlet 14. The doser 18 may comprise an injector mounted in the exhaust conduit 12. For the depicted embodiment, the agent introduced through doser 18 is diesel fuel; however, other embodiments are contemplated in which one or more different dosing agents are used in addition to or in lieu of diesel fuel. Additionally, dosing could occur at a different location from that illustrated. For example, a fuel-rich setting could be provided by appropriate activation of injectors (not shown) that provide fuel to the engine in such a manner that engine 112 produces exhaust including a controlled amount of uncombusted (or incompletely combusted) fuel (in-cylinder dosing). Doser 18 is in fluid communication with a fuel line 40 coupled to the same or a different fuel source (not shown) than that used to fuel engine 112. A shut-off valve 42 is provided to shut-off the supply of fuel to doser 18 under emergency or certain failure conditions.

The exhaust gas management subsystem 10 also includes a Diesel Oxidation Catalytic (DOC) device 22 positioned downstream from doser 18. DOC device 22 is of a flow-through type that may be in the form of a canister with a honeycomb-like structure or substrate. The substrate can have a large surface area that is coated with one or more active catalysts. These catalysts may be provided as small amounts of well-dispersed precious metals, such as platinum or palladium. However, other DOC structures, compositions, and/or arrangements are also contemplated. As the exhaust passes through DOC device 22, catalyzation of an exothermic oxidation reaction results in which the reactants typically include: molecular oxygen, carbon monoxide, gaseous hydrocarbons, and liquid hydrocarbon droplets (including unburned fuel from doser 18). Such oxidation is desired for the removal of selected constituents—particularly for processing downstream from DOC device 22. Accordingly, DOC device 22 is sometimes referred to as being a pre-catalytic apparatus even though it may include catalytic material and initiate one or more catalytic reactions.

Subsystem 10 also includes an inlet temperature sensor 24 positioned within housing 12 upstream of the DOC device 22 for measuring the temperature of the exhaust entering DOC device 22, and an outlet temperature sensor 26 positioned within housing 12 downstream of DOC device 22 for measuring the temperature of the exhaust gas exiting DOC device 22. Subsystem 10 has a catalyzed particulate filter 28 positioned downstream from sensor 26 to receive exhaust from DOC device 22.

Filter 28 may be used to substantially reduce particulate matter entrained in the exhaust stream exiting DOC device 22. Such matter includes, but is not limited to soot, which is often predominantly comprised of elemental carbon. In one form, filter 28 may be of a wall flow soot trapping type with a supported catalyst. As exhaust enters filter 28 desired constituents are captured and accumulate within filter 28. From time-to-time, accumulated matter needs to be purged from filter 28, which typically involves a regeneration process. One regeneration process includes raising temperature to oxidize the trapped matter through the reaction $C+O_2 \rightarrow CO_2$, among others. This temperature increase can be provided, at least in part, by dosing DOC device 22 with hydrocarbons to catalyze the exothermic reaction $C_yH_x+O_2 \rightarrow CO_2+H_2O$, among others, and otherwise facilitate conditions desired to regenerate filter 28. In one alternative embodiment, more than one filter is utilized (not shown).

A filter inlet pressure sensor 30 is positioned upstream of filter 28 for measuring the pressure of the exhaust gas entering filter 28. A filter outlet pressure sensor 32 is positioned downstream of the filter 28 for measuring pressure of the exhaust gas exiting the filter 28. In addition to or in lieu of sensors 30 and 32, and a gas pressure difference detector could be utilized. It should be appreciated that as matter accumulates in filter 28, a pressure drop may occur across the inlet and the outlet of filter 28 typically increase. When the magnitude of such pressure difference reaches a selected level, it can trigger performance of a filter regeneration cycle. An exhaust gas outlet temperature sensor 34 is positioned downstream of filter 28 for measuring the temperature of the exhaust gas as it exits the exhaust gas management subsystem 10. The exit temperature indicated by sensor 34 can be used to determine whether regeneration is desired as an addition or alternative to a pressure differential via sensors 30 and 32. Alternatively, dosing may be selected on a different basis and/or may be approximately continuous to provide for a generally constant catalytic reaction for selective removal with aftertreatment equipment 117.

Controller 142 is generally operable to control and manage operational aspects of system 110, including subsystem 10. Controller 142 includes memory 145 as well as a number of inputs and outputs for interfacing with various sensors and subsystems coupled to engine 112. Controller 142 can be an electronic circuit comprised of one or more components, including digital circuitry, analog circuitry, or both. Controller 142 may be a software and/or firmware programmable type; a hardwired, dedicated state machine; or a combination of these. In one embodiment, controller 142 is of a programmable, solid-state, integrated circuit type of Digital Signal Processor (DSP) that includes memory 145 and one or more central processing units and/or arithmetic logic units (CPUs, ALUs, or the like).

Memory 145 can be comprised of one or more components and can be of any volatile or nonvolatile type, including the solid-state variety, the optical media variety, the magnetic variety, a combination of these, or such different arrangement as would occur to those skilled in the art. Controller 142 can include signal conditioners, signal format converters (such as analog-to-digital and digital-to-analog converters), limiters, clamps, filters, and the like as needed to perform various control and regulation operations described herein. Optionally, controller 142 can include an interface to a computer network that could be wireless, permitting mobility of system 110 or through a cable, such as electrical conductor or optic fiber type. This interface can be used to download, upgrade, or modify some or all of any programmable operating logic for controller 142, typically by loading such operating logic in memory 145.

Controller 142 may be a standard type sometimes referred to as an electronic or engine control module (ECM), electronic or engine control unit (ECU) or the like, that is directed to the regulation and control of generally all aspects of engine operation. Alternatively, controller 142 may be dedicated to control of just the operations described herein or to a subset of controlled aspects of engine 112. In any case, controller 142 preferably includes one or more control algorithms defined by operating logic in the form of software instructions, hardware instructions, dedicated hardware of a digital and/or analog type, or the like. This logic will be described in greater detail hereinafter, with respect to the operation of various aspects of system 110.

Controller 142 is operatively coupled to doser 18 to selectively activate dosing in accordance with its operating logic and is also operatively coupled to sensors 24, 26, 30, 32, and 34 to receive corresponding input signals therefrom. These couplings provide for the regulation/control of subsystem 10. For example, controller 142 can be programmed to monitor input signals indicative of accumulated matter in filter 28 to trigger regeneration when a certain level is detected. During regeneration, dosing can be used to provide elevated temperature and otherwise facilitate the removal of trapped matter from filter 28 in the manner previously described. Additionally or alternatively, controller 142 regulates different aftertreatment processes in other embodiments and/or different aftertreatment devices may included in addition to or in lieu of some or all of aftertreatment equipment 117. Additionally or alternatively, aftertreatment equipment 117 can be arrange to actively trap nitrogen oxide (NOx) and/or sulfur oxide (Sox) compounds, removing them from the exhaust stream. Such trapping can be provided by separate catalytic devices, filters, adsorbers, or the like; and/or integrated into the illustrated equipment. In one alternative, dosing is used to perform a Selective Catalytic Reduction (SCR) process of a standard type.

Figure 3:
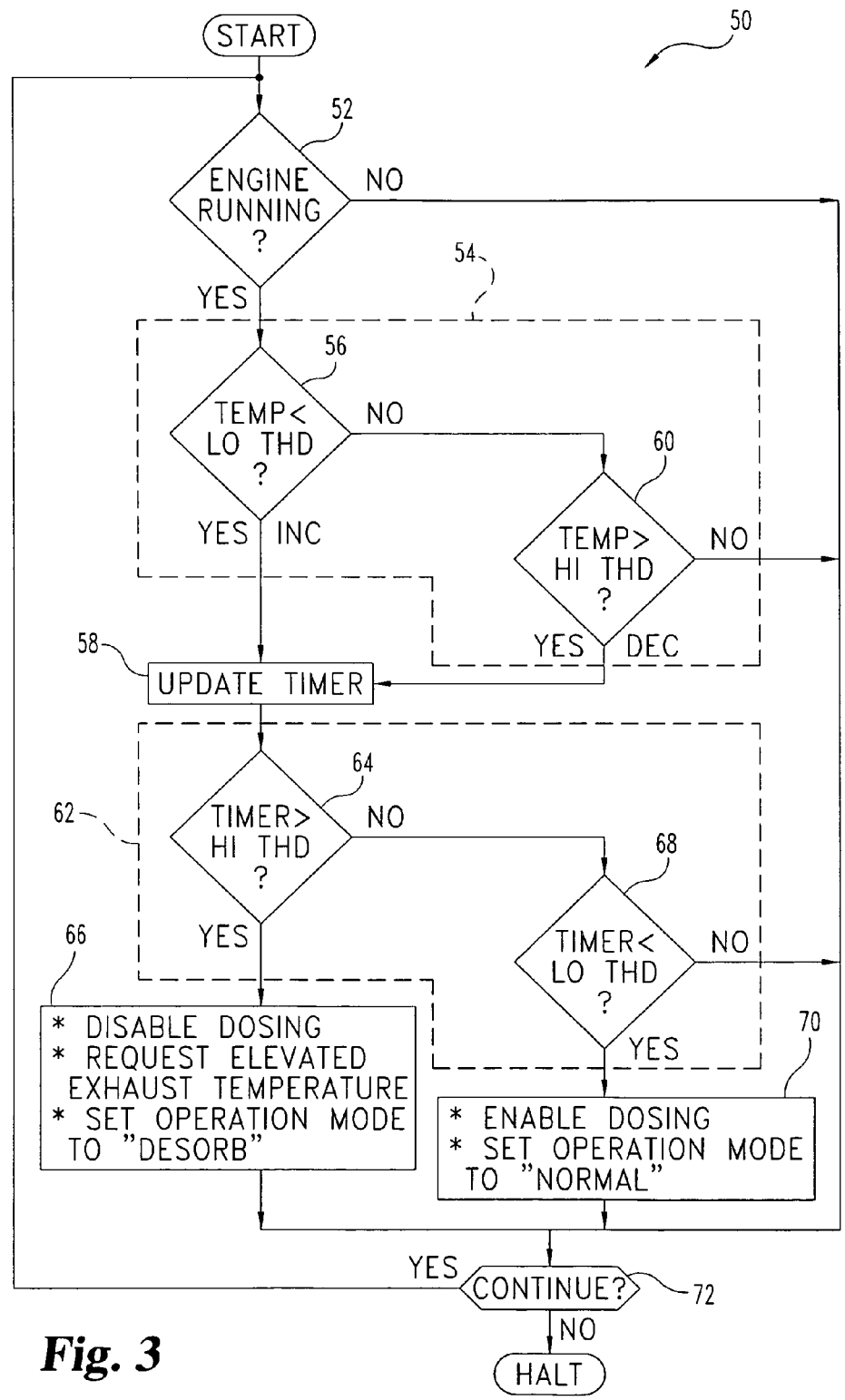
FIG. 3 is a flowchart of one form of an adsorption agent accumulation reduction procedure that may be implemented with the subsystem of FIG. 2.

The flowchart of FIG. 3 reflects one further aftertreatment control procedure 50 that may be implemented with subsystem 110 in accordance with operating logic of controller 142. Procedure 50 is directed to tracking an accumulated amount of adsorbed HC and/or $H_2O$ by an aftertreatment device, such as DOC device 22, and initiating a desorption mode of operation when the accumulated amount reaches a given threshold magnitude. Typically, adsorption accumulation becomes significant during extended idle operation of system 110. Such extended idle conditions can be particularly prominent with overnight idle operation indicative of certain power generation applications, but also can arise in other applications such as vehicles, pumps, and the like. Procedure 50 is described hereinafter using adsorption by surfaces of DOC device 22 as an example; however, it should be understood that a like procedure could be utilized to control adsorption by other aftertreatment components.

Procedure 50 begins with conditional 52 which tests whether engine 112 is operating under a condition for which adsorption material accumulation would be of concern. As previously indicated, this condition may be an idle state of engine 112, or other operating state depending on the specifics of the situation. If the test of conditional 52 is true (yes), procedure 50 enters inlet temperature routine 54. If the test of conditional 52 is negative (no), procedure 50 reaches conditional 72 which tests whether to continue procedure 50 or not. If procedure 50 continues (yes), control returns to re-execute conditional 52, otherwise procedure 50 halts. In various embodiments, procedure 50 is interatively performed on a scheduled, periodic basis or an aperiodic basis in response to an interrupt or time-varying polling routine, to name just a couple of nonlimiting possibilities.

Upon entry into routine 54, conditional 56 is executed that tests whether the inlet temperature as indicated by sensor 24 is less than a lower threshold. For temperatures below this threshold temperature, adsorption is typically taking place. Accordingly conditional 56 proceeds to update operation 58 with a timer/counter increment signal INC (yes). In operation 58, a digital counter, operating effectively as a form of timer, is incremented in response to the INC signal from conditional 56. Conversely, if the test of conditional 56 is false (no), routine proceeds to conditional 60. Conditional 60 tests if the inlet temperature from sensor 28 is greater than an upper threshold above which desorption of an adsorbed substance (if present) takes place. If the test of conditional 60 is false (no) procedure 50 continues with conditional 72, which executes as previously described. If the test of conditional 60 is true (yes) a decrement signal DEC is sent to operation 58 to decrement the counter.

From operation 58, procedure 50 enters timer routine 62. Timer routine 62 begins with conditional 64. Conditional 64 tests whether the timer (counter) exceeds a designated upper threshold. If the test of conditional 64 is false (no), routine 62 continues at conditional 68. Conditional 68 tests whether the timer (counter) is below a designated threshold. If the test of conditional 68 is true (yes), routine 62 is exited by procedure 50 and continues with operation 70. In operation 70, dosing with doser 18 is enabled if it was previously disabled and operation of subsystem 10 is set to normal with respect to adsorption accumulation management. If the test of conditional 68 is false (no), then procedure 50 continues with conditional 72, as previously described.

If the test of conditional 64 of routine 62 is true (yes), operation 66 is encountered by procedure 50 as it exits routine 62. In operation 66, dosing is disabled and generation of an elevated exhaust temperature from engine 112 is requested. Further, a desorption mode of operation is triggered. The elevation of temperature in operation 66 can be accomplished, by way of not limiting example, through the adjustment of one or more of control devices 114. Such control devices 114 could include fuel injectors, a variable geometry turbocharger turbine, exhaust gas recirculation valve, exhaust throttle, intake throttle, air intake valve timing, exhaust valve timing, or the like, which affects temperature of the exhaust stream from engine 112 when adjusted.

As set forth above, a timer/counter may receive either a count-up signal INC or a count-down signal DEC via execution of conditional 56 and 60, respectively. The signal INC corresponds to the rate of adsorbed substance accumulation and the decrement signal DEC corresponds to the rate this substance is desorbed. Collectively, timer routine 62 monitors the elapsed adsorption/desorption process—tracking whether an upper threshold has been reached that is indicative of an undesirable accumulated amount of adsorbed material. This threshold can be determined empirically for a given set of operating conditions and/or a given equipment configuration. When above this threshold, control measures are taken in operation 66 to increase temperature so that desorption of the previously adsorbed substance takes place.

Correspondingly, conditional 68 of routine 62 determines if the timer is low enough that normal operation can resume (there being little, if any, adsorbed substance accumulation). It should be appreciated that the lower temperature threshold and upper temperature threshold of conditionals 56 and 60 of routine 54 are determined empirically and generally differ from one another; however, in other embodiments these temperatures may be the same. Further, it should be appreciated that these temperature thresholds would vary depending on the type of adsorbed substance of interest. For example, it has been discovered that HC adsorption and desorption take place at different temperature thresholds than $H_2O$ adsorption and desorption. Similarly, desired upper and lower timer thresholds utilized in conditional 64 and 68 of routine 62 may differ from one another and from one type of adsorbed material to another. Furthermore, a single timer threshold could also be utilized instead of two different thresholds in an alternative embodiment. Generally, the thresholds associated with routines 54 and 62 can be calibrated for a given configuration and entered as calibration values.

Once the timer reaches a calibrated low threshold, the request for thermal management triggered in operation 66 is cleared in operation 70. The calibrated low threshold for conditional 68 may be a value of zero or any other number. Operation 66 may also set a flag that indicates when the engine 112 is operating in thermal management or desorption mode instead of the normal mode. When in the desorption mode, the flag is set positive and when in normal mode, the flag is cleared or set to zero. The timer values and flag values may also be power-down safe. As such, when the system 110 restarts, it does not lose track of the status of absorption/desorption prior to the restart. It has been surprisingly discovered that white smoke and accompanying odor can be reduced that otherwise have been observed to occur after extended periods of idle operation.

Many other alternatives, forms, and embodiments of the present application are envisioned. For example, while various subsystems, controllers and the like are illustrated and described in connection with a land traveling vehicle 100, it should be appreciated that they could also be used in connection with a variety of other applications including electrical power generators, marine and naval propulsion systems, pipeline and other pumping systems, and other industrial or commercial systems and apparatus to name just a few. In still other embodiments, substance accumulation is controlled for other catalytic apparatus capable of HC or $H_2O$ absorption and/or adsorption other than those for diesel fuel applications.

In another example, a system includes an internal combustion engine operable to produce exhaust, an exhaust subsystem to receive the exhaust from the engine that includes an aftertreatment device, a temperature sensor positioned in the exhaust subsystem upstream from the aftertreatment device to sense temperature of exhaust gas entering the aftertreatment device, a controller responsive to this sensor, and at least one engine control device responsive to an output signal from the controller. The controller times the duration that the temperature is less than a first value corresponding to adsorption of one or more substances by the aftertreatment device and selectively adjusts this duration for one or more time intervals the temperature is greater than a second value corresponding to desorption of the one or more substances. The controller generates the output signal if the duration reaches a selected threshold. In response to the output signal, the engine control device increases the temperature of the exhaust entering the aftertreatment device to cause desorption of such one or more substances. In one form, the substances include HC and/or $H_2O$.

Still another example includes: generating exhaust gas with an engine system, sensing temperature of the exhaust gas entering an aftertreatment device, monitoring and amount of time the temperature is less than a first value corresponding to adsorption of one or more substances by the aftertreatment device, adjusting the amount of time for one or more time intervals the temperature is greater than a second value corresponding to desorption of the one or more substances, and increasing the temperature of the exhaust gas to cause desorption of the one or more substances by controlling the engine system in response to the duration reaching a threshold. In one form, the substances include HC and/or $H_2O$.

Yet another example comprises an engine system that includes: means for generating exhaust gas, means for sensing temperature of the exhaust gas entering an aftertreatment device, means for monitoring an amount of time the temperature is less than a first value corresponding to adsorption of a substance including at least one of a hydrocarbon and $H_2O$ by the aftertreatment device, means for adjusting the amount of time for one or more time intervals the temperature is greater than a second value corresponding to desorption of such substance, and means for increasing the temperature of the exhaust gas to cause desorption of the substance by controlling the engine system in response to the duration reaching a threshold.

A further embodiment includes: aftertreatment equipment comprising a doser operable to selectively introduce an aftertreatment agent into a diesel engine exhaust system, a diesel oxidation catalyst device downstream from the doser, a sensor upstream from the diesel oxidation catalyst device to sense temperature of the exhaust stream entering the diesel oxidation catalyst device, a controller responsive to the temperature sensor with operating logic encoded on one or more media executable by the controller to: time a duration the temperature is less than a first value corresponding to adsorption of a substance including one or more of a hydrocarbon and $H_2O$ by the aftertreatment device, decrease the duration for one or more time intervals the temperature is greater than a second value corresponding to desorption of the substance, and increase the temperature of the exhaust to cause the desorption of the substance if the duration reaches a threshold indicative of an undesired amount of the substance.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A system, comprising:
an internal combustion engine operable to produce exhaust;
an exhaust subsystem to receive the exhaust from the engine, the subsystem including an aftertreatment device;
a temperature sensor positioned in the exhaust subsystem upstream from the aftertreatment device to sense temperature of exhaust gas entering the aftertreatment device;
a controller responsive to the temperature sensor to time a duration temperature is less than a first value corresponding to adsorption of a substance including one or more of a hydrocarbon and $H_2O$ by the aftertreatment device and selectively decrease the duration for one or more time intervals the temperature is greater than a second value corresponding to desorption of the substance, the controller generating an output signal if the duration reaches a threshold indicative of an undesired adsorbed accumulation of the substance; and
at least one engine control device responsive to the output signal to increase the temperature of the exhaust entering the aftertreatment device to cause the desorption of the substance.

2. The system of claim 1, wherein the controller includes:
means for increasing a counter if the temperature is less than the first value;
means for decreasing the counter if the temperature is greater than the second value;
means for comparing the counter to the designated threshold; and
means for generating the output signal if the counter is less than or equal to the threshold.

3. The system of claim 1, wherein the engine control device includes means for increasing idle speed of the engine in response to the output signal.

4. The system of claim 1, wherein the aftertreatment device is a diesel oxidation catalyst device.

5. The system of claim 4, wherein the subsystem includes a doser positioned upstream of the diesel oxidation catalyst device.

6. The system of claim 1, wherein said controller is operable to maintain the engine in a nominal idle mode at a first engine speed before the duration reaches the threshold and a thermal management mode at a second engine speed after the duration reaches the threshold, the output signal being provided to perform the thermal management mode, the second engine speed being greater than the first engine speed.

7. The system of claim 6, wherein the controller includes means for restarting timing of the duration after the thermal management mode halts.

8. A method, comprising:
generating exhaust gas with an engine system;
sensing temperature of the exhaust gas entering an aftertreatment device;
monitoring an amount of time the temperature is less than a first value corresponding to adsorption of a substance including one or more of a hydrocarbon and $H_2O$ by the aftertreatment device;
adjusting the amount of time for one or more time intervals the temperature is greater than a second value corresponding to desorption of the substance; and
in response to the duration reaching a threshold, increasing the temperature of the exhaust gas to cause desorption of the substance by controlling the engine system.

9. The method of claim 8, which includes increasing engine speed to cause the increasing of the temperature of the exhaust gas.

10. The method of claim 8, further comprising raising an exhaust flow rate in response to the duration reaching the threshold.

11. The method of claim 8, wherein the aftertreatment device is a diesel oxidation catalyst device and the engine system includes a hydrocarbon doser.

12. The method of claim 11, which includes:
setting a flag to indicate that the engine system is operating in thermal management mode in response to the duration reaching the threshold; and
disabling fuel dosing with the while the engine is operating in the thermal management mode.

13. The method of claim 11, which includes restarting the monitoring of the amount of time after the increasing of the temperature is performed for a designated time period.

14. The method of claim 8, wherein the timing is performed by increasing a counter in response to the temperature being less than the first value and decrementing the counter in response to the temperature being greater than the second value.

15. The method of claim 14, wherein the first value and the second value are different from one another.

16. The method of claim 15, which includes tracking the duration with a counter before and after restarting the engine system.

17. An apparatus, comprising: aftertreatment equipment, including:
a doser operable to selectively introduce an aftertreatment agent into a diesel engine exhaust stream;
a diesel oxidation catalyst device downstream from the doser;
a sensor upstream from the diesel oxidation catalyst device to sense temperature of the exhaust stream entering the diesel oxidation catalyst device;
a controller responsive to the temperature sensor with operating logic encoded on one or more media executable by the controller to: (a) time a duration the temperature is less than a first value corresponding to adsorption of a substance including one or more of a hydrocarbon and $H_2O$ by the aftertreatment device, (b) decrease the duration for one or more time intervals the temperature is greater than a second value corresponding to desorption of the substance, and (c) increase the temperature of the exhaust stream to cause the desorption of the substance if the duration reaches a threshold indicative of an undesired adsorbed accumulation of the substance.

18. The apparatus of claim 17, wherein the one or more media include a nonvolatile memory device.

19. The apparatus of claim 17, wherein the one or more media include at least a portion of a computer network.

20. The apparatus of claim 17, further comprising a diesel-fueled, internal combustion engine operable to provide the exhaust stream and responsive to the controller to increase rotational engine speed to increase the temperature of the exhaust stream when the duration reaches the threshold.

* * * * *